United States Patent
Düsing et al.

(10) Patent No.: US 9,482,106 B2
(45) Date of Patent: Nov. 1, 2016

(54) COMBUSTOR TRANSITION

(71) Applicant: ALSTOM Technology Ltd, Baden (CH)

(72) Inventors: Michael Düsing, Rheinfelden (DE); Mirko Ruben Bothien, Zürich (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 320 days.

(21) Appl. No.: 14/062,091

(22) Filed: Oct. 24, 2013

(65) Prior Publication Data

US 2014/0109579 A1 Apr. 24, 2014

(30) Foreign Application Priority Data

Oct. 24, 2012 (EP) .................................. 12189723

(51) Int. Cl.
 F01D 9/02 (2006.01)
 F02C 7/12 (2006.01)
 F23R 3/00 (2006.01)
(52) U.S. Cl.
 CPC .............. F01D 9/023 (2013.01); F02C 7/12 (2013.01); F23R 3/002 (2013.01); *F05D 2250/52* (2013.01); *Y10T 29/49229* (2015.01)
(58) Field of Classification Search
 CPC ............ F01D 9/023; F01D 9/02; F02C 3/14; F02C 7/12; F02C 7/18; F05D 2240/12; F05D 2240/121; F05D 2260/20; F23R 3/002; F23R 3/46
 See application file for complete search history.

(56) References Cited

U.S. PATENT DOCUMENTS

| | | | | |
|---|---|---|---|---|
| 4,016,718 A * | 4/1977 | Lauck | ..................... | F01D 9/023 60/39.37 |
| 6,450,762 B1 * | 9/2002 | Munshi | ................... | F01D 9/023 415/138 |
| 6,840,048 B2 * | 1/2005 | Han | ......................... | F01D 9/02 60/39.37 |
| 2010/0037617 A1 * | 2/2010 | Charron | ................. | F01D 9/023 60/752 |
| 2010/0115953 A1 | 5/2010 | Davis, Jr. et al. | | |
| 2010/0313568 A1 | 12/2010 | Davis, Jr. et al. | | |
| 2011/0000218 A1 * | 1/2011 | Arase | .................... | F01D 25/246 60/772 |
| 2012/0247125 A1 * | 10/2012 | Budmir | .................. | F01D 9/023 60/805 |
| 2014/0000265 A1 * | 1/2014 | Simo | ...................... | F01D 9/023 60/752 |

FOREIGN PATENT DOCUMENTS

| | | |
|---|---|---|
| CN | 1971011 A | 5/2007 |
| EP | 0 620 363 | 10/1994 |
| EP | 0 718 470 | 6/1996 |
| EP | 1 403 582 | 3/2004 |
| EP | 2 492 596 | 8/2012 |
| EP | 2 511 612 | 10/2012 |
| SU | 1449775 A1 | 1/1989 |
| WO | 2012/136787 | 10/2012 |

\* cited by examiner

*Primary Examiner* — Andrew Nguyen

(74) *Attorney, Agent, or Firm* — Buchanan Ingersoll & Rooney PC

(57) ABSTRACT

A combustor transition can be adapted to guide combustion gases in a hot gas flow path extending between a combustor and a first stage of a turbine in a gas turbine. The combustor transition includes a duct having an upstream end adapted for connection to the combustor and a downstream end adapted for connection to a first stage of the turbine. The downstream end comprises an outer wall, an inner wall, a first side wall and a second side wall. At least one side wall has a side wall extension, which can extend in a downstream direction beyond the outlet. A gas turbine can be retrofitted with such a combustor transition and a gas turbine with such a combustor transition can also undergo a borescope inspection.

18 Claims, 4 Drawing Sheets

COMBUSTOR TRANSITION

CROSS-REFERENCE TO RELATED APPLICATIONS

This application claims priority to European application 12189723.5 filed Oct. 24, 2012, the contents of which are hereby incorporated in its entirety.

TECHNICAL FIELD

The invention relates to a combustor transition with a wall extension for thermo acoustic decoupling of adjacent combustors, a turbine comprising such a combustor transition as well as a method for retrofitting a gas turbine with such a combustor transition.

BACKGROUND

Gas turbines with can combustors are known from various applications in power plants. The combustion process in such gas turbines can lead to dynamic can-to-can coupling. Such a dynamic or thermo acoustic thermo acoustic coupling of gas turbine can combustors may lead to strong pulsations in particular to strong low frequency pulsations, which negatively affect the stability and lifetime of the combustor. This may lead to reduced lifetime or in extreme cases to a mechanical failure of the gas turbine. In order to mitigate thermo acoustic pulsations usually dampers or resonators are installed and/or staging of the fuel supply is done as described for example in the US2010/0313568. Since low frequency dampers require large volumes this solution is not favored. Fuel staging has a detrimental impact on the emission performance due to the creation of local hot spots (leading to $NO_x$ emissions) and local cold spots (leading to CO emissions).

This type of thermo acoustic pulsations are difficult to predict analytically and can only be observed rather late in the development process, since full engine tests need to be performed in order to detect unstable modes with can-to-can interaction. Even if dampers or resonators are provided these still need tuning in a late development stage and in worst case require engine specific tuning during commissioning of each individual engine.

Coupling of the different can combustors takes place through:
- the turbine inlet in the area downstream of the combustors or the combustor transition the piece to the turbine and upstream of the leading edges of the turbine's first stage vanes,
- the main air supply to the burners,
- cooling and leakage air supply to combustor or
- cross-ignition tubes arranged between cans.

SUMMARY

In order to avoid such pulsations effective decoupling of the can combustors is suggested. This invention is intended to decouple thermo acoustic interaction between cans via the turbine inlet, which is seen as the most dominant coupling path. This coupling path is dominant since it has the largest areas and involves the smallest pressure drop between two neighboring cans. In this case the can-to-can type thermo acoustic pulsations can be avoided in general without the need for staging and dampers. Hence lifetime is increased and emissions are reduced.

One aspect of the present disclosure is to propose a combustor transition from a can combustor to the turbine inlet adapted to guide combustion gases in a hot gas flow path extending between a gas turbine can combustor and a first stage of turbine. The combustor transition comprises a duct having an inlet at an upstream end adapted for connection to the can combustor and an outlet at a downstream end adapted for connection to a first stage of a turbine. The downstream end comprises an outer wall, an inner wall, as well as a first and a second side wall. The outer and inner walls of adjacent combustor transitions form an annular flow path with an outlet, the outlet being connected to the turbine inlet.

The inlet of a combustor transition typically has the same cross section as the can combustor to which the transition piece is attached. These can for example be a circular, an oval or a rectangular cross section. The outlet typically has the form of a segment of an annulus. A plurality of combustor transitions installed in the gas turbine form an annulus for guiding the hot gas flow into the turbine.

According to a first embodiment at least one side wall has a side wall extension, which is extending in a downstream direction beyond the outlet at the downstream end of the combustor transition.

When installed in the gas turbine the side wall extension reaches into the flow channel of the turbine inlet thereby decoupling the thermo acoustic interaction between can combustors via the turbine inlet.

According to a further embodiment the side wall extension of the combustor transition comprises a cooling channel. This cooling channel is for example enclosed by a first side wall extension and a second side wall extension, which separate the cooling channel from the hot gas flow path, typically forming a hollow flow path in-between the two side wall extension. A cooling channel can also be formed by the side wall extensions of two combustor transitions, which are configured such that the side wall extensions of the two combustor transitions form a cooling channel, when they are installed next to each other in a gas turbine.

According to another embodiment the combustor transition has the side wall extension, which is split into the first side wall extension and the second side wall extension, by a split line comprising a seal. The cooling channel can be enclosed or formed by the two side wall extensions.

In yet another embodiment the combustor transition has a first side wall, which ends at the outlet, and a second side wall which has a side wall extension, which is extending in a downstream direction beyond the outlet at the downstream end of the combustor transition. This side wall extension has a U-shaped cross-section; with a first leg of the U-shaped extension connected to the second side wall. The extension is separating a hot gas side from a cooling side and a second leg of the U-shaped extension is beginning directly downstream of the outlet on the cooling side of the first side wall extension. The second leg is connected to the first leg by a third leg at the downstream end. The U-shaped extension is thereby forming a cooling channel between the first leg, the second leg, and the third leg.

The second leg of the U-shaped extension is configured such that the second leg of the extension begins directly downstream of the first sidewall of a neighboring combustor transition, which has no extension, to form one streamlined contour on the hot gas side of the first side wall/second leg, when two combustor transitions are installed next to each other in a gas turbine.

In an alternative embodiment the first side wall of the combustor transition has a short first side wall extension, which extends beyond the outlet at the downstream end of the combustor transition, and a second side wall has a long second side wall extension, which is extending in a downstream direction beyond the short first side wall extension forming a J-shaped extension. In this J-shaped extension the part of the long side wall extension, which is extending beyond the short side wall extension has U-shaped cross section, wherein a first leg of the U is part of the long side wall extension, separating a hot gas side from a cooling side. A second leg of the U-shaped extension begins downstream of the outlet on the cooling side of the first leg and is arranged substantially parallel to the first leg. The second leg is connected to the first leg by a third leg at the downstream end.

The second leg of the U-shaped long side wall extension is configured such that the second leg of the extension begins directly downstream of the short first sidewall extension of a neighboring combustor transition, to form one streamlined contour on the hot gas side of the first side wall/second leg, when two combustor transitions are installed next to each other in a gas turbine.

According to an embodiment the cooling channel formed by one or more side wall extensions is closed towards the outer wall, i.e. when installed in the gas turbine at the end of the cooling space, which is facing the outer vane platform of the first turbine stage, and/or towards the inner wall, i.e. when installed in the gas turbine at the side of the cooling space, which is facing the inner vane platform of the first turbine stage. The cooling space or cooling channel can be closed towards the outer wall and/or towards the inner wall by an end plate.

According to a further embodiment the end plate towards the wall, and/or towards the inner wall is split into a first end plate and into a second end plate by the split line. Each of the first and second end plate can be connected to the first and second end wall extension (e.g. by brazing or welding) or form an integral part of the corresponding end wall extension (e.g. in a casted or machined part).

According to another embodiment the end plate is at least partly separated from the first side wall extension by a gap and at least partly connected to the second side wall extension. This embodiment can be advantageous for cases in which the second side wall extension extends further downstream of the combustor transition outlet. When every second combustor is removed the respective side of the shorter first extension will then offer an unobstructed access for baroscopic inspection of the adjacent hot gas flow path.

Besides the transition piece a can combustor comprising such a combustor transition piece is an object of the disclosure. The transition piece can be a separate component, which is connected to the can combustor, or it can be an integral part of the can combustor. The can combustor and transition piece can for example be casted, extrusion formed, or manufactured by welding or brazing Further, a gas turbine comprising such a combustor transition piece is an object of the disclosure. The gas turbine has at least one compressor, at least one turbine, and at least one can combustor, wherein the disclosed combustor transition is installed between the can combustor and the turbine.

When installed in a gas turbine the side wall extension of a combustor transition is extending downstream into a space between the inner and outer platform of a vane one of the turbine. When installed the side wall extension is ending directly upstream of an airfoil of the vane one. Adjacent first and second side wall extension and the subsequent airfoil can be arranged such that their surfaces are aligned to form one smooth surface facing the hot gas flow path.

To minimize losses during the operation of the gas turbine the at least one side wall extension is extending downstream to the leading edge of a vane one airfoil such that in only leave a gap which is sized to allow for thermal expansion between the can combustor and turbine.

According to a further embodiment the side wall extension is arranged between two vanes and is extending beyond the leading edge in the downstream direction. The leading edge can for example extend into the area of the smallest flow area between two vanes. During operating typically the flow velocity reaches critical speed in this area, thus the side wall extension reaching into this regain can effectively block any acoustic coupling between two sides of the side wall extension.

The proposed combustor transition can be used for new gas turbines as well as for retrofitting existing gas turbines. A method for retrofitting a gas turbine comprises the steps of opening the gas turbine housing, removing at least one existing combustor transition, installing at least one of the disclosed combustor transitions with a side wall extension, and of closing the gas turbine housing.

To give access for baroscopic inspection of the hot gas flow path inspection the can combustor and/or combustor transition can be removed. To reduce the time required for removal of combustor transitions it is advantageous if only a part of the transition needs to be removed. However, with the side wall extension access from one combustor to the hot gas flow path of a neighboring hot gas transition is restricted. To reduce the number of combustor transitions, which have to be removed, a method for borescope inspection of a gas turbine with a combustor transition which has a no or only a short side wall transition on one side of the outlet is proposed: According to this method every second combustor transition is removed for inspection and the hot gas path downstream of the removed combustor transition and the inspection of the hot gas path of the neighboring combustor, which remains installed in the gas turbine. The neighboring combustor is inspected via the gap, which is opened by removing the side wall extension together with the removed combustor transition.

Inspection of the hot gas path can be done in combustor hot gas paths even further apart if the resonator holes are arranged in both side walls of a side wall extension, and these are sufficiently aligned and large enough to allow passing of a borescope.

The above described combustor transition, can combustor and gas turbine can be a single combustion gas turbine or a sequential combustion gas turbine as known for example from EP0620363 B1 or EP0718470 A2. It can also be a combustor transition of a gas turbine with one of the combustor arrangements described in the WO2012/136787. The disclosed retrofit method as well as baroscopic inspection method can be applied to single combustion gas turbine or a sequential combustion gas turbine.

BRIEF DESCRIPTION OF THE DRAWINGS

The invention, its nature as well as its advantages, shall be described in more detail below with the aid of the accompanying drawings. Referring to the drawings:

FIG. 1b shows a cross section of the turbine inlet with combustor transitions of the gas turbine from FIG. 1a.

DETAILED DESCRIPTION

The same or functionally identical elements are provided with the same designations below. The examples do not constitute any restriction of the invention to such arrangements.

Figure 1A:
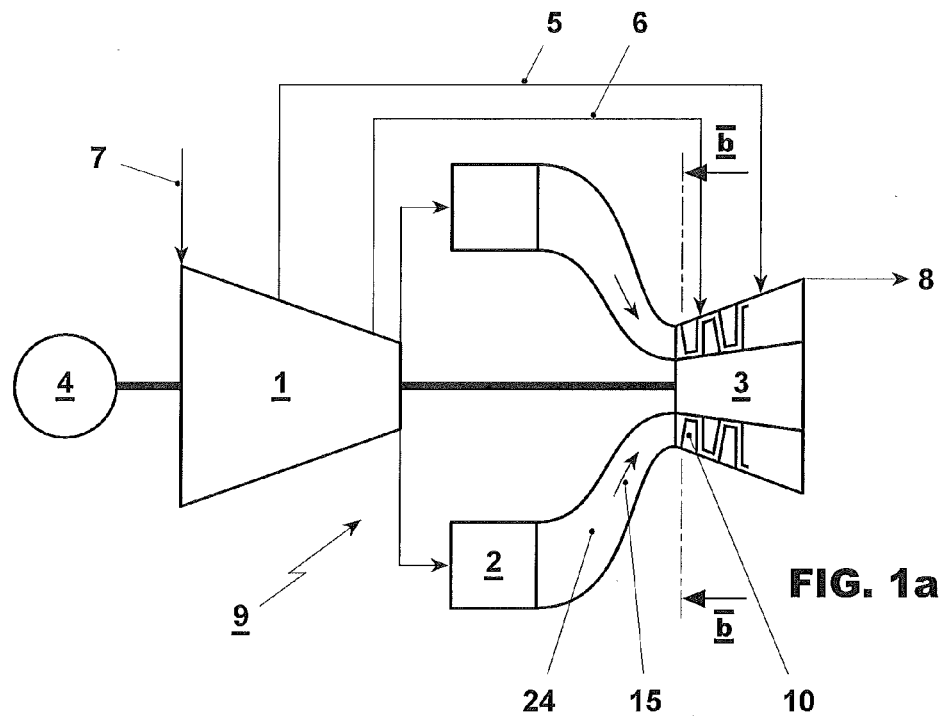
FIG. 1a shows an example of a gas turbine according to the present invention.

An exemplary arrangement is shown in FIG. 1a. The gas turbine 9 is supplied with compressor inlet gas 7. In the gas turbine 9 a compressor 1 is followed by a combustion chamber comprising a plurality of can combustors 2. Hot combustion gases are fed into a turbine 3 via a plurality of combustor transitions 24. The can combustors 2 and combustor transition 24 form a hot gas flow path 15 leading to the turbine 3. The combustor transition 24 connects the can combustors 2 of the combustion chamber with the vane one 10 of the turbine 3.

Cooling air 5, 6 is branched off from the compressor 1 to cool the turbine 3 and combustor. In this example the cooling systems for high pressure cooling air 5 and low pressure cooling air 6 are indicated.

Exhaust gas 8 leaves the turbine 3. The exhaust gas 8 is typically used in a heat recovery steam generator to generate steam for cogeneration or for a water steam cycle in a combined cycle (not shown).

Figure 1B:
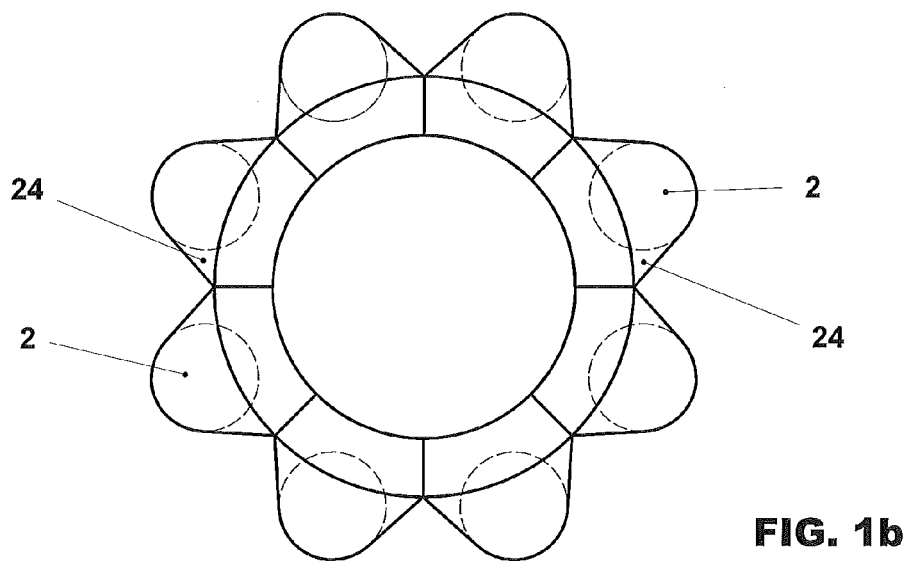

The combustor transitions 24 of the gas turbine 9 of the cross section B-B are shown in FIG. 1b. The combustor transitions 24 guide the hot gases from the can combustors 2 to the turbine and are arranged to form an annular hot gas duct at the turbine inlet.

Figure 2:
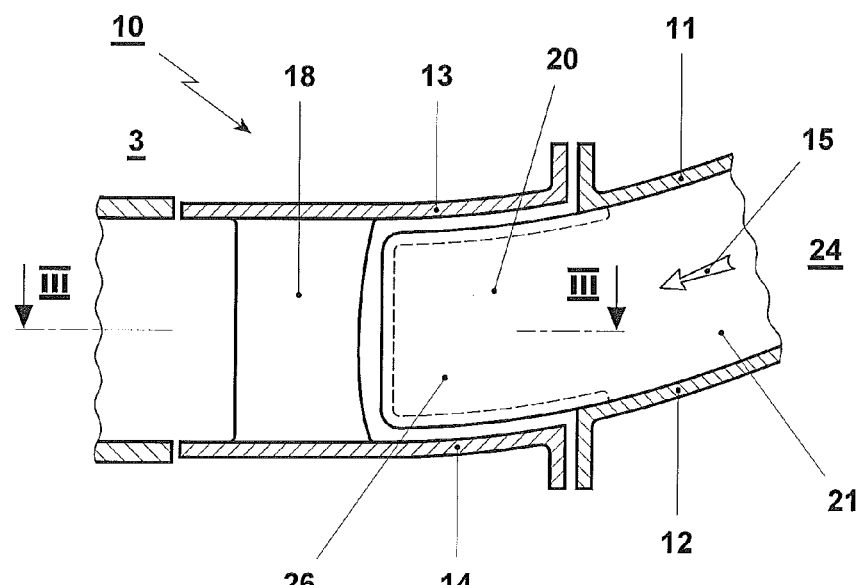
FIG. 2 shows an example of a combustor transition arrangement with a vane one of a turbine according to the present invention.

An example for the interface between combustor transition 24 and the vane one 10 is shown in more detail in FIG. 2. Inside the combustor transition 24 the combustor transition outer wall 11, the combustor transition inner walls 12 and the side walls 21 confine the hot gas flow path 15. At the outlet of the combustor transition 24 the cross section of each combustor transition has the geometrical shape of a sector of the annulus, which forms the hot gas flow path 15 at the turbine inlet. The flow path continues into the vanes one 10 of the turbine 3. The inner platforms 14 and outer platforms 13 delimit the hot gas flow path in the turbine inlet. The airfoils 18 of the turbine vanes 10 extend in radial direction between the inner platform 14 and outer platform 13 of the vane one 10 and at least partly divide the hot gas flow in the circumferential direction. The side wall extension 20 comprises a cooling volume (the side walls are only indicated as dotted lines in this view). To separate the hot gas flow path 15 into decoupled sections the side wall 20 of combustor transition 21 is arranged upstream of the airfoil 18 and a side wall extension 20 is extending into the space confined by the inner vane platform 14 and outer vane platform 13. The side wall extension 20 ends upstream of the leading edge of the airfoil 18. As shown in FIG. 2 typically a gap can remain between the airfoil 18 and the side wall extension 20 to allow for axial movements to thermal expansions in the turbine and in the combustor. Typically, the airfoil 18 and side wall extension 20 should not touch each other to avoid mechanical damage of the parts, in particular of a coating or thermal barrier coating which can be applied to the surface of the parts.

Figure 3:
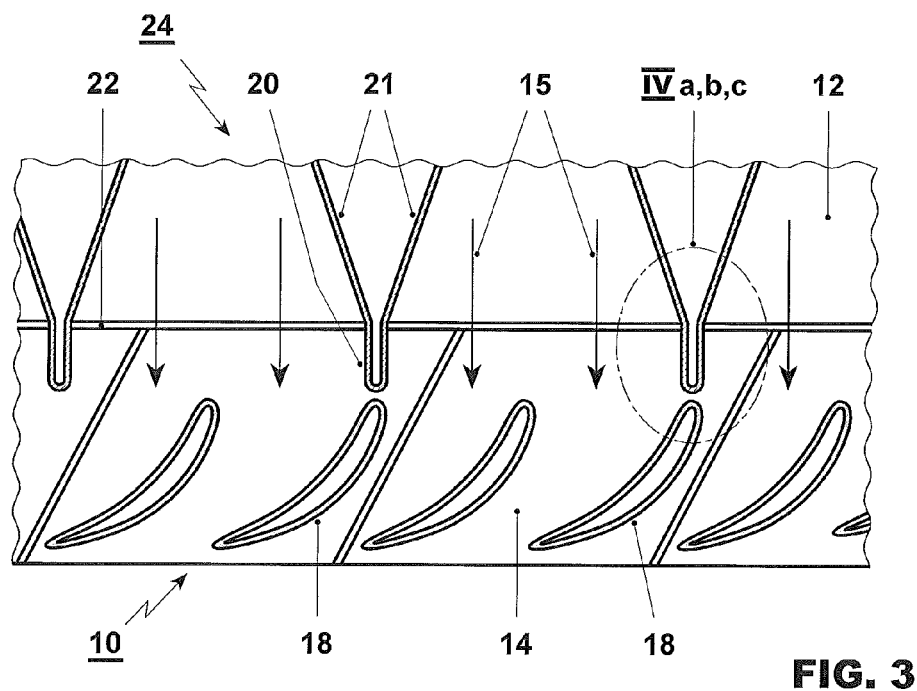
FIG. 3 shows a cross section III-III of FIG. 2 with the combustor transition arrangement and vane one.

The cross section III-III from FIG. 2 of the combustion transitions 24 and the vanes one 10 is shown in FIG. 3. In this example vane arrangements comprising two airfoils 18 arranged between one inner and one outer platform 13, 14 are shown. In this example one such vane arrangement with two airfoils 18 is arranged downstream of each combustor transition 24.

The number of airfoils per inner- and outer platform (vane arrangement) is not limited to two and can be any integer number. Also the number of airfoils allocated to each transition piece is not limited to two but can be any number. Because an arrangement with side wall extension only every other combustor transition or every second, third, fourth etc. combustor transition can be used, the number of airfoils allocated to each transition piece is not limited to integer numbers. Inside the combustor transition 24 the hot gas flow path 15 is divided into separate channels by the combustor transition side walls 21. The vanes 10 are arranged downstream of the combustor transition 24. Upstream of every second airfoil 18 a side wall extension 20 extends to the upstream end of the airfoil 18.

Different ways to design a combustor transition side wall extension 20 are possible. The details of three examples of such side wall extensions are shown in FIGS. 4a, b, and c.

Figure 4A:
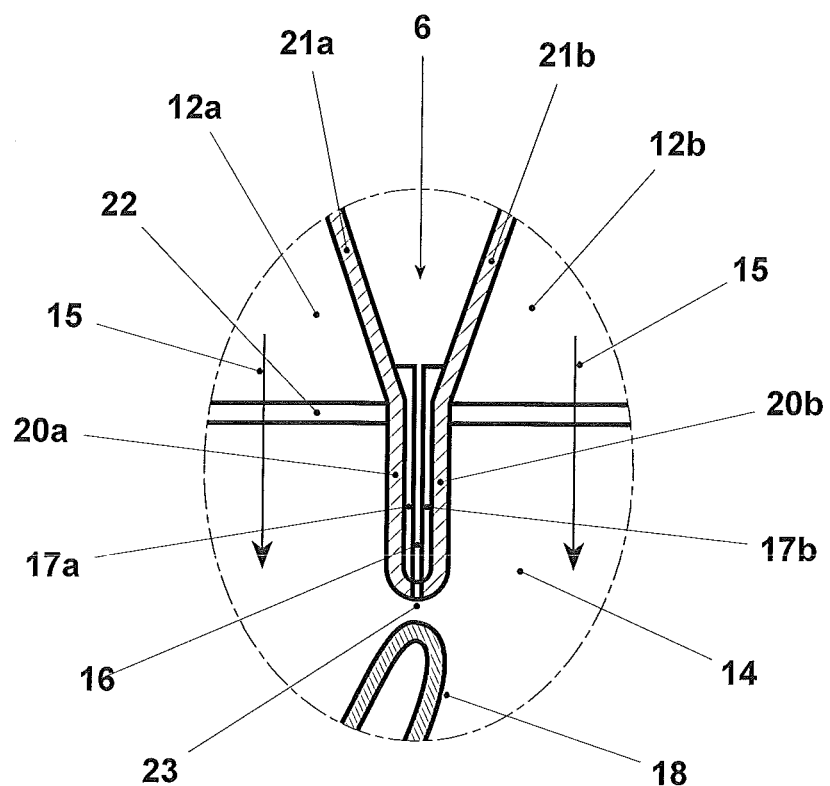
FIG. 4a, b, c shows details of examples of different embodiments of combustor transition side wall extensions.

In the example of FIG. 4a the right combustor transition side wall 21b of a first combustor transition 24 and the left combustor transition side wall 21a of the neighboring combustor transition end next to each other at the outlet 22 of the combustor transition. The right combustor transition side wall 21a is extended downstream to form a right side wall extension 20a and the left combustor transition side wall 21b is extended downstream to form a left side wall extension 20b. Both side wall extensions 20a, 20b are arranged next to each other (in this example parallel to each other) thereby forming a side wall extension 20 comprising a duct or cooling channel between the inner vane one platform 14 and the outer vane one platform. This duct is open towards the space between the right combustor transition side wall 21a of a first combustor transition 24 and the left combustor transition side wall 21b of the neighboring combustor transition. High pressure cooling air 6 is supplied to this cooling channel from the space between the right combustor transition side wall 21a of a first combustor transition 24 and the left combustor transition side wall 21a of the neighboring first combustor transition 24. To reduce the cooling air losses the left and right side wall extensions 20a, 20b, can be bend towards each other at their downstream end as shown in FIG. 4a. In addition, to reduce the cooling air losses the channel between the left and right side wall extensions 20a, 20b can be closed by an end plate 17 at the side radially outer and inner end of the side wall extensions 20a, 20b, i.e. at the end facing the inner side vane platform 14 and/or at the end facing the outer vane platform 13. In the example shown in FIG. 4a the end plate 17 comprises a left end plate 17a, which is attached to the left side wall extensions 20a, and a right end plate 17b, which is attached to the right side wall extensions 20b.

Figure 4B:
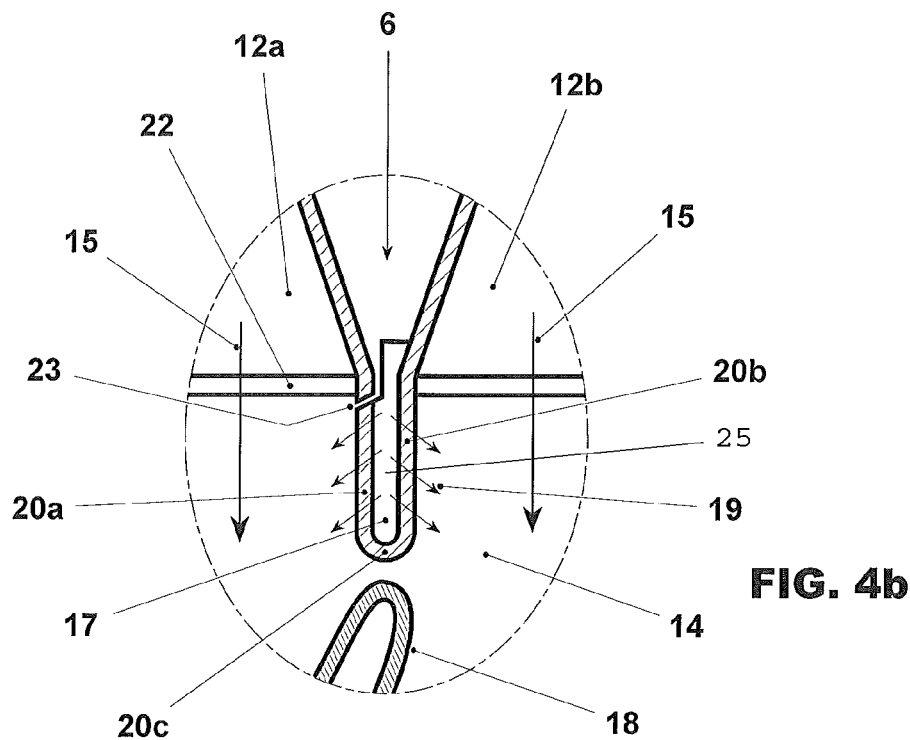

Between the left and right end plates 17a, 17b at the inner and/or outer position a gap 10 or split line 16 can remain open to allow for thermal extension and assembly tolerances. Also between the downstream ends of the left and right side wall extensions 20a, 20b a gap 23 can be foreseen to allow for thermal extension and assembly tolerances. FIG. 4b shows an alternative end wall extension. In this example the left combustor transition side wall 21a ends at the outlet 22 without an extension. Only the right 15 combustor transition side wall 21b is extended to form the combustor transition side wall extensions 20. Here the right combustor transition side wall extension 20b does not end at the downstream end but the side wall extension of the right side wall 21b has a U-form and the left combustor transition side wall extension 20a is connected to the right combustor transition side wall extension 20b at the downstream end. The U-form includes a first leg 20b, a second leg 20a, and a third leg 20c. In this example 20 the end plate 17 is provided as one piece connecting the left and right side wall extensions 20a, 20b.

The example of FIG. 4b has the advantage that the open gap 23 and split line 16 between left and right combustor transition side wall extensions can be minimized to a gap 23 at the downstream end of the left combustor transition side wall 21a, thus reducing cooling air losses. Additionally, for inspections of the outlet 22 area downstream of two neighboring combustor transitions 24 only one combustor transition 24 has to be removed.

For better cooling of the combustor transition side wall extension 20 film cooling and/or effusion cooling holes 19 are provided in the left and right combustor transition side wall extensions 20a, 20b. Cooling air is supplied via the cooling channel 25 enclosed by the first and second side wall extensions 20a, 20b. Film cooling and/or effusion cooling holes can be provided for all of the examples in FIGS. 4a, 4b and 4c as well as any other side wall extension arrangement.

Figure 4C:
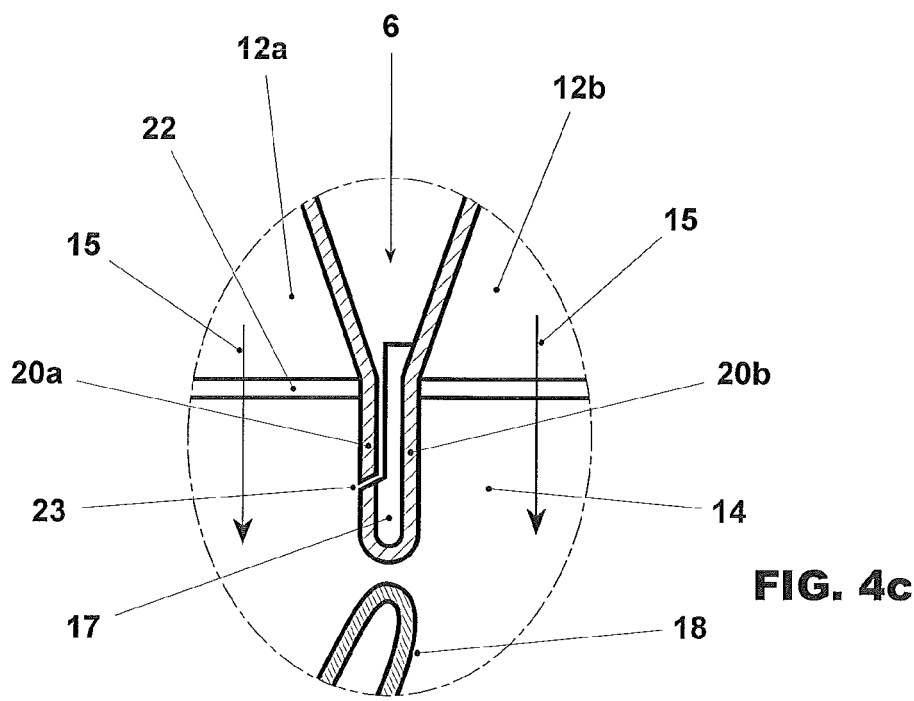

The third example shown in FIG. 4c is a compromise between the examples shown in FIGS. 4a and 4b. The right combustor transition side wall 21a of a first combustor transition 24 and the left combustor transition side wall 21a of the neighboring combustor transition are arranged to end next to each other at the outlet 22 of the combustor transition. The right combustor transition side wall 21a is extended downstream to form a right side wall extension 20a and the left combustor transition side wall 21a is extended downstream to form a left side wall extension 20b. Both side wall extensions 20a, 20b are arranged next to each other (in this example parallel to each other). The left side wall extension 20a is shorter than the right side wall extension 20b.

The downstream end of the right side wall extension 20a forms an extension with a U-shaped cross section, with one leg (20b) of the U-being part of the long side wall extension (20b) and the second leg (20b) of the U-shaped extension ending directly downstream of the short side wall extension (20a).

In this example the end plate 17 is provided as one piece connected to the right side wall extensions, 20b. A gap 23 is formed at the downstream end of the left side wall extension 20a.

For all embodiments the combustor transition side wall extension 20, 20a 20b can be one integral part of the combustor transition side wall 21, 21a 21b, for example in a casted, bended, pressed or forged piece. They can also be attached or fixed to the combustor transition side wall 21, 21a 21b, for example by welding, brazing, screws or rivets.

The end plate 17, 17a, 17b can be one integral part of the side wall extension(s) 20, 20a 20b, for example in a casted, bended, pressed or forged piece. The can also be attached or fixed to the combustor transition side wall extension 20, 20a 20b, for example by welding, brazing, screws or rivets.

The invention claimed is:

1. A combustor transition system adapted to guide combustion gases in a hot gas flow path extending between a gas turbine combustion chamber and a first stage of a turbine, the combustor transition system comprising:
   a plurality of ducts comprising a first duct and a second duct, each of the ducts having an inlet at an upstream end adapted for connection to the combustion chamber and an outlet at a downstream end adapted for connection to the first stage of the turbine, wherein the downstream end comprises an outer wall, an inner wall, a first side wall, and a second side wall;
   the first side wall of the first duct having a first side wall extension that extends in a downstream direction beyond an outlet of a first combustor transition;
   the second side wall of the second duct having a second side wall extension that extends in the downstream direction beyond an outlet of a second combustor transition;
   the first side wall extension being split from the second side wall extension by a split line; and
   the second side wall extension extending in the downstream direction beyond the first side wall extension, the second side wall extension being longer than the first side wall extension, a portion of the second side wall extension extending beyond the first side wall extension having a U-shaped cross section that is configured to separate a hot gas side from a cooling side.

2. The combustor transition system according to claim 1, wherein the first side wall extension at least partially defines a cooling channel through which cooling air is passable.

3. The combustor transition system according to claim 1, wherein a first leg of the U-shaped cross-section is connected to the second side wall of the second duct, and a second leg of the U-shaped cross-section is arranged next to the first leg and is connected to the first leg by a third leg to define a cooling channel between the first leg, the second leg and the third leg.

4. The combustor transition system according to claim 2, wherein the cooling channel is closed towards at least one of the outer wall and towards the inner wall of the first or second duct by an end plate.

5. The combustor transition system according to claim 4, wherein the end plate is split into a first end plate and into a second end plate by the split line.

6. The combustor transition system according to claim 4, wherein the end plate is at least partly separated from the first side wall extension by a gap.

7. A can combustor system with a combustion chamber, wherein the can combustor chamber comprises a combustor transition system according to claim 1.

8. A gas turbine with at least one compressor, at least one turbine, and at least one combustion chamber, wherein the gas turbine comprises a combustor transition system according to claim 1.

9. The gas turbine according to claim 8, wherein the second side wall extension is extending downstream of the at least one combustion chamber into a space between an inner platform of a vane and an outer platform of the vane directly upstream of an airfoil of the vane.

10. The gas turbine according to claim 9, wherein the second side wall extension is extending downstream to the leading edge of the airfoil and leaving a gap which is sized to allow for thermal expansion between the combustion chamber and the at least one turbine.

11. A method for retrofitting a gas turbine comprising:
   opening a housing of the gas turbine,
   removing at least one existing combustor transition,
   installing at least one combustor transition system according to claim 1, and
   closing the housing after the at least one combustor transition system according to claim 1 is installed.

12. A method for borescope inspection of a gas turbine with a combustor transition system according to claim 3 comprising:
  removing the first or second combustor transition for inspection of a hot gas path downstream of the removed combustor transition as well as a hot gas path of a neighboring combustor that remains installed in the gas turbine via a gap that is opened by removing at least one of the second side wall extension and the first side wall extension with the removed combustor transition.

13. The combustor transition system of claim 1, comprising:
  an end plate connected between the first and second side wall extensions, a gap being defined between the first side wall extension and the end plate.

14. The combustor transition system of claim 1, wherein the first and second side wall extensions at least partially defining a cooling channel, the combustor transition system comprising:
  an end plate connected between the first and second side wall extensions, a gap being defined by the end plate that splits a first part of the end plate attached to the first side wall extension from a second part of the endplate attached to the second side wall extension.

15. The combustor transition system of claim 14, wherein the gap is defined such that cooling air from the cooling channel is passable through the gap.

16. The combustor transition system of claim 1, wherein first and second side wall extensions at least partially defining a cooling channel, the combustor transition system comprising:
  an end plate connected between the first and second side wall extensions, a gap being defined between the first side wall extension and the end plate.

17. The combustor transition system of claim 16, wherein the gap is defined such that cooling air from the cooling channel is passable through the gap.

18. The combustor transition system of claim 2, wherein the first side wall extension at least partially defining a gap, cooling air from the cooling channel being passable through the gap.

* * * * *